July 25, 1961 D. W. DUNIPACE ET AL 2,993,402
MEASURING OF MATERIALS BY USE OF POLARIZED LIGHT
Filed Aug. 3, 1956 5 Sheets-Sheet 1
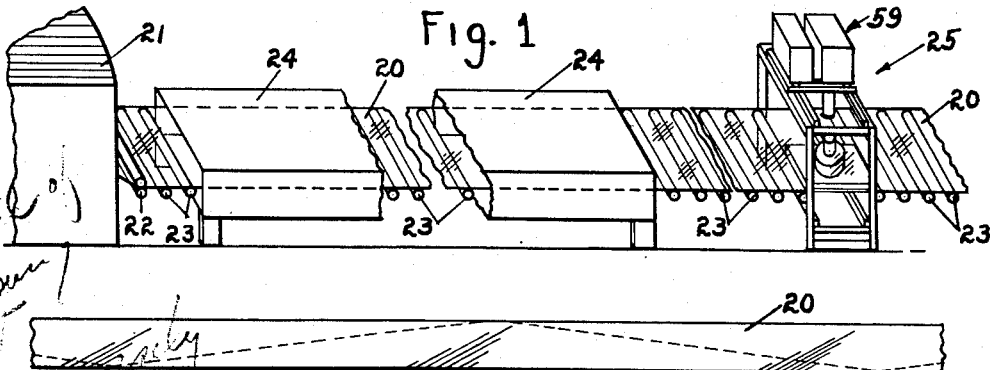
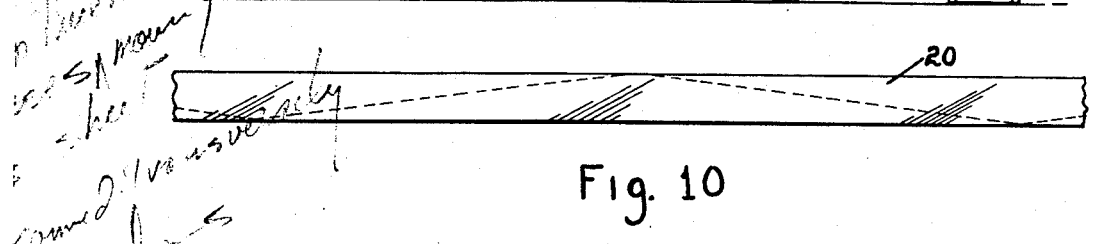
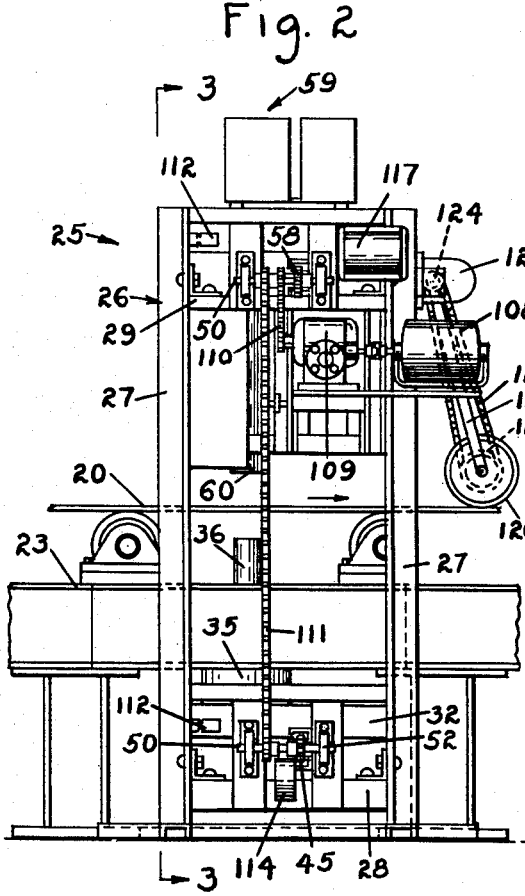
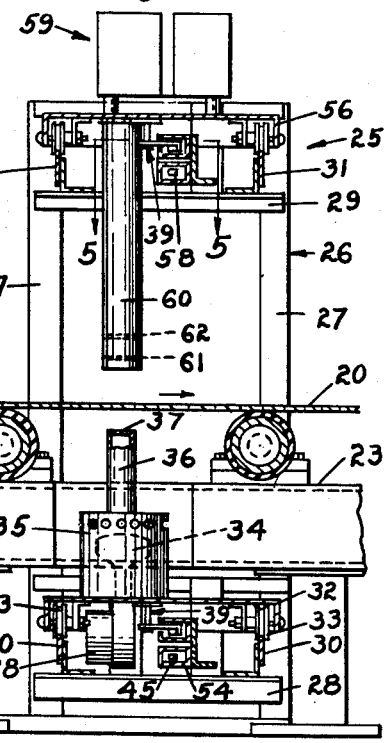
INVENTORS
Donald W. Dunipace and
BY John R. Ermlich
Nobbe & Swope
ATTORNEYS

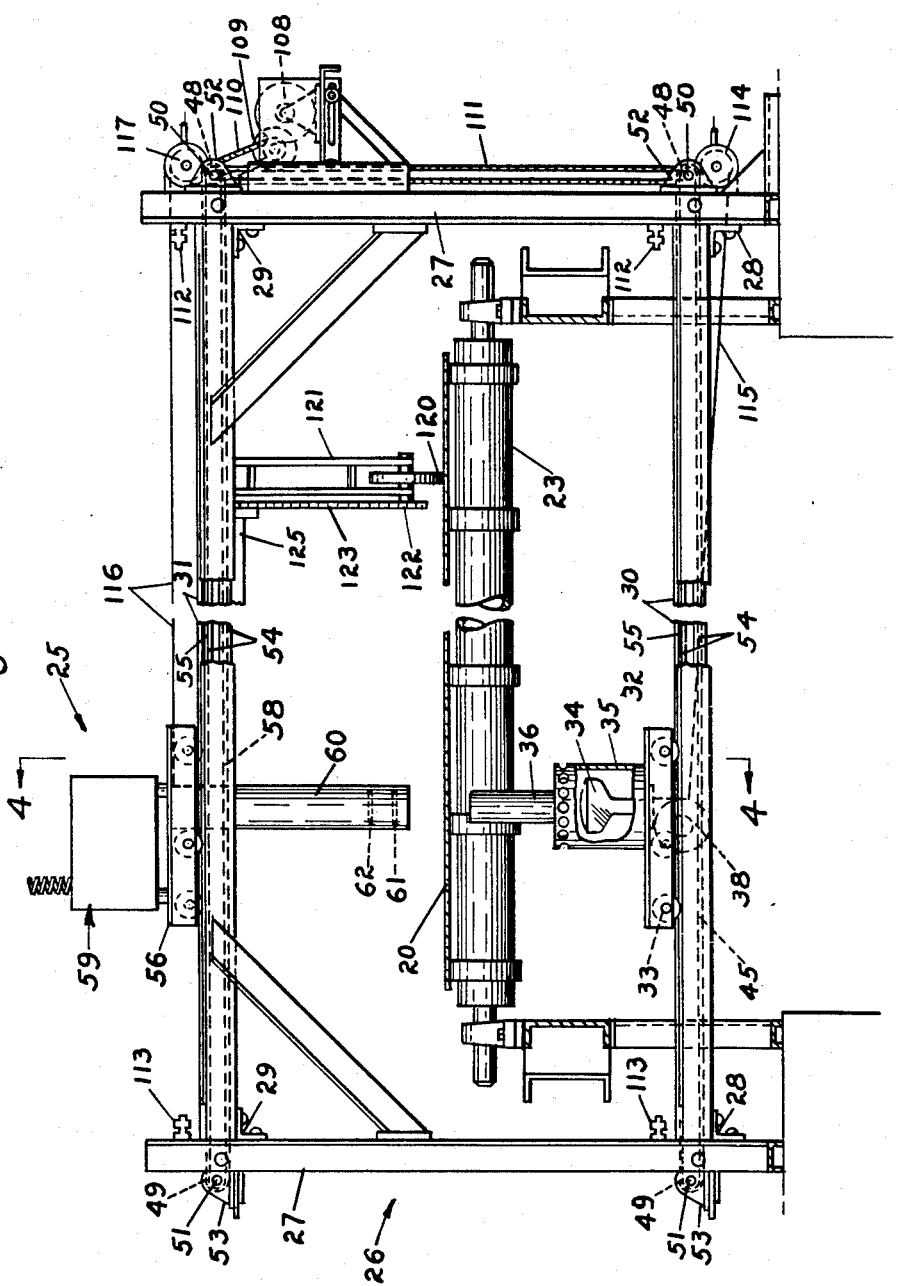

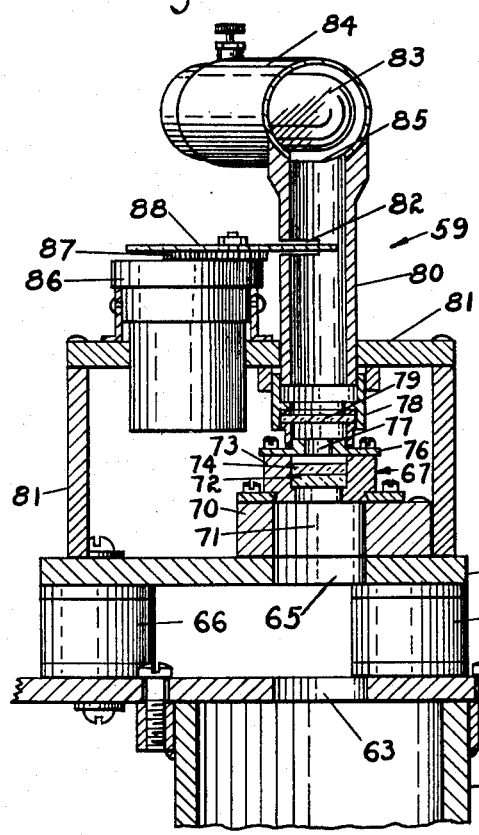
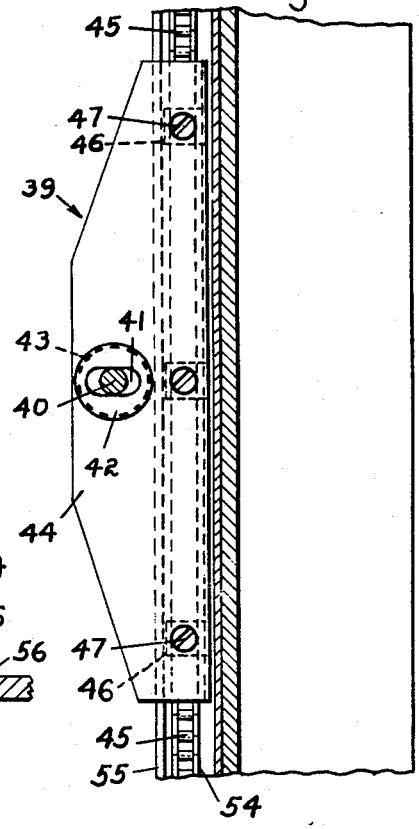
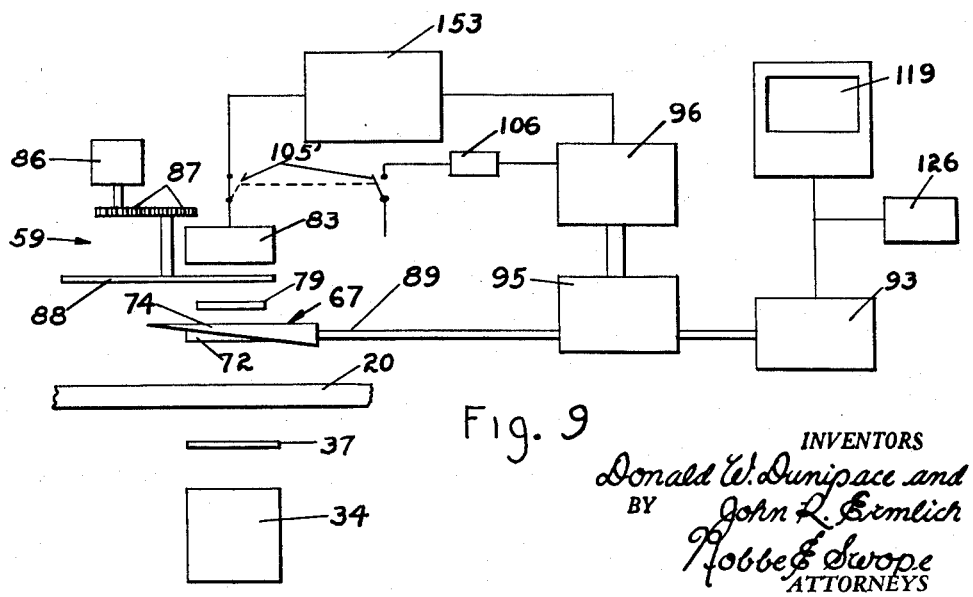

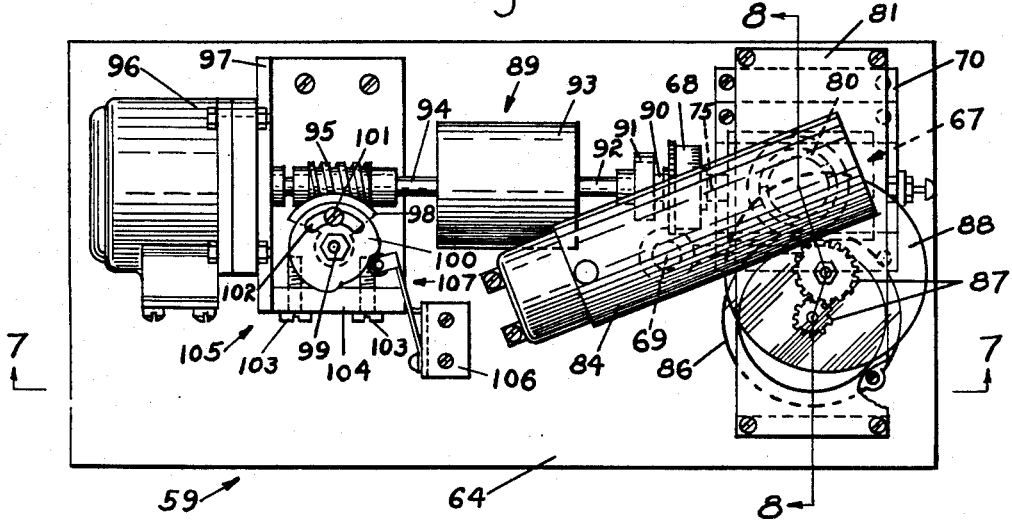

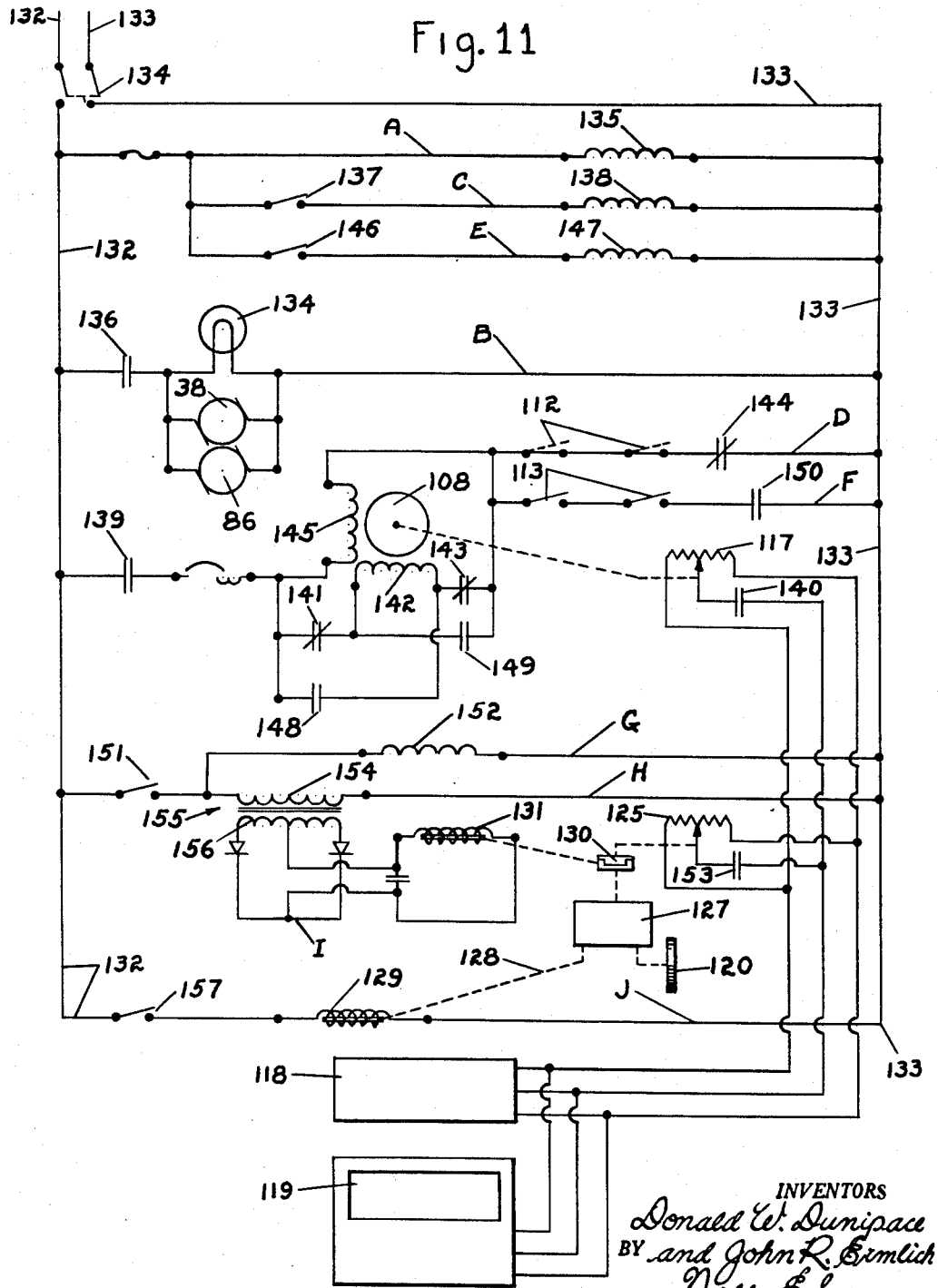

United States Patent Office 2,993,402
Patented July 25, 1961

2,993,402
MEASURING OF MATERIALS BY USE OF POLARIZED LIGHT
Donald W. Dunipace and John R. Ermlich, Perrysburg, Ohio, assignors to Libbey-Owens-Ford Glass Company, Toledo, Ohio, a corporation of Ohio
Filed Aug. 3, 1956, Ser. No. 601,891
11 Claims. (Cl. 88—14)

This invention relates to a method and apparatus for measuring the stress in or thickness of materials.

While the invention is not limited to any particular type of material, it is particularly useful in the manufacture of plate glass wherein the constituents are first reduced to a molten mass and then rolled into a continuous glass strip. This strip is cooled gradually under controlled temperatures in a long lehr, for annealing purposes, and then subjected to a grinding and polishing process. Success in producing a good quality end product depends largely upon providing the proper internal stress pattern in the glass, prior to grinding. A desirable stress pattern is established by controlling temperatures in the lehr so as to produce compressive stresses near the edge of the strip and tensile stresses in the rest of the strip.

In the past to determine the stress pattern in the glass manually operated optical instruments have been used, however, since the glass strip travels about 150 inches per minute and operation of the manual instrument is quite slow, its value as a quality control device is quite limited. Broadly, the invention is comprised of the following: an optical stress measuring system, an electro-mechanical error reducing system, a stress recording system and a carriage for carrying the first two mentioned components powered to traverse the strip or to be positioned at any transverse point relative to the strip.

It is therefore an important object of the invention to provide a method and apparatus for measuring and recording the stress in or thickness of materials.

It is still another object to provide a measuring and recording instrument which records stress as a function of either longitudinal or transverse position of moving strip materials.

A still further object of the invention is to provide apparatus for automatically measuring the stress in glass sheet materials.

Other objects and advantages of the invention will become more apparent during the course of the following description when taken in connection with the accompanying drawings.

In the drawings wherein like numerals are employed to designate like parts throughout the same:

FIGURE 1 is a perspective showing a melting furnace, a conveyor for the glass, an annealing lehr and the frame and carriage for the stress measuring instrument;

FIGURE 2 is an enlarged end elevation of the stress measuring instrument, carriage and drive therefor;

FIGURE 3 is a cross-sectional view taken on the line 3—3 of FIGURE 2;

FIGURE 4 is a cross-sectional view taken on the line 4—4 of FIGURE 3;

FIGURE 5 is an enlarged sectional view of the carriage drive and lost motion device, taken on the line 5—5 of FIGURE 4;

FIGURE 6 is a plan view of the stress measuring instrument with the cover removed;

FIGURE 7 is an elevation partly in section of the apparatus shown in FIGURE 6 taken on the line 7—7;

FIGURE 8 is a cross-section taken on the line 8—8 of FIGURE 6;

FIGURE 9 is a schematic drawing of the stress measuring instrument, indicator and recorder;

FIGURE 10 is a diagrammatic plan of a glass strip showing the line of transverse measurement in dashed lines upon the face of the strip; and FIGURE 11 is a functional diagram of the electrical circuits other than those associated with the stress measuring instrument.

Referring to FIGURE 1 of the drawings, a glass strip 20 is drawn from a furnace 21, passed between forming rolls 22 onto a powered roller conveyor 23 and through annealing lehr 24, all of which are well-known in the art. The stress measuring instrument, generally indicated by the numeral 25, is located in close proximity to the outlet from the lehr, at which time the glass strip 20 is at a substantially uniform temperature. To further insure that the temperature of the glass is constant over its entire width as it passes through the measuring zone, a film of water may be spread over the strip ahead of such zone.

Referring now to FIGURES 2, 3 and 4, the stress measuring apparatus, as previously mentioned, is generally indicated by the numeral 25 and includes an angle iron frame 26 which bridges the conveyor 23 and is comprised of a pair of upright angles 27 on each side of the conveyor 23, an angle 28 joining each pair of uprights 27 near the bottom thereof and another angle 29 joining each pair of uprights near the top. Two pairs of tracks 30 and 31 are respectively supported on the angles 28 and 29, above and below the glass strip 20, and are positioned transversely with respect to the glass strip and parallel to the surfaces of the strip.

A lower carriage 32 having circumferentially grooved wheels 33 rides on tracks 30 and carries an uprightly mounted electric lamp 34 encased in a perforated, cylindrically shaped housing 35 which is surmounted by a cylindrical tube 36 concentric with the longitudinal axis of the lamp 34 and the housing 35. The tube 36 terminates a short distance below the level of the glass strip 20 and is closed at the top by a stationary polarizing disk 37. A blower 38 is mounted on the underside of the carriage 32 and directs a cooling stream of air inside the housing 35 to dissipate the heat from lamp 34. Also attached to the underside of the carriage 32 is a coupling device 39, shown in detail in FIGURE 5.

The coupling device 39 is comprised of a pin 40 fixed to and depending from the carriage 32 through an elongated slot 41 in an annularly shaped, shouldered bushing 42 loosely seated in a circular hole 43 formed in an angle plate 44. The pin 40 and the slot 41 compensate for manufacturing tolerances. The plate 44 is fastened to a chain 45 by clips 46 and screws 47. As shown in FIG. 3 the chain 45 is carried by sprockets 48 and 49 respectively supported by shafts 50, 51 and bearings 52, 53 on opposite ends of the frame 26. The chain 45 passes through a pair of rectangularly shaped guards 54 spaced one above the other and the upper one is provided with a longitudinally extending slot 55 (FIG. 3) to provide clearance for the plate 44.

An upper carriage 56 rides upon the tracks 31 and is connected by a coupling 39 to a chain 58 in the same manner as described in connection with the lower carriage 32. A photoelectric stress analyzing device, generally indicated by the numeral 59 and shown in detail in FIGS. 6, 7 and 8 and schematically in FIG. 9, is mounted on the carriage 56. Depending from the analyzing device 59 is a tube 60 which houses a stress relieved planoconvex lens 61 for light collecting and a green filter 62 (FIGS. 3 and 4) to increase the effectiveness of a quarter wave plate to be described hereinlater; both are concentrically disposed with relation to a smaller circular hole 63 extending through the base of the carriage 56. A base plate 64 having a circular opening 65 substantially the same diameter as hole 63 and in axial alignment therewith is secured to the carriage 56 with resilient shock absorbing mountings 66 interposed.

A quartz wedge compensator 67 (FIGS. 6 and 8) such as an L–135 Soleil Babinet Compensator manufactured by the Gaertner Scientific Corporation or equivalent, having a micrometer adjustment 68 and adjustment locking means 69 is mounted on a block 70, the latter having a circular opening 71 axially aligned with the openings 65 and 63 in the base 64 and the carriage 56. The compensator wedge 67 is comprised of a lower wedge 72 held stationary in a holder 73 (FIG. 8), an upper wedge 74 the latter being connected to the vernier adjustment 68 by a shaft 75. A cap 76 containing an aperture 77 formed in an upwardly extending annularly shaped boss is telescopically received by a tubular holder 78 for a quarter wave plate 79, which may be a type L—293 Hg, manufactured by the Gaertner Scientific Corporation, or equivalent.

The upper portion of the holder 78 telescopically receives an upwardly extending tube 80 passing through and frictionally supported by a bridge 81 rising from the base 64 and a horizontally disposed slot 82 is milled or otherwise formed on the left hand side of the tube above the bridge 81 as shown in FIG. 8. A phototube detector 83 is mounted horizontally in a tubular case 84 which is soldered or otherwise fastened to the top of tube 80 and has an opening 85 therein aligned with the bore of tube 80. A synchronous motor 86 extends through and is fastened to the upper face of the bridge 81 and carries reduction gearing 87 to drive a rotating polarizing disk 88 which extends through the slot 82 to substantially intersect the entire area of the bore in the tube 80.

The mechanical connections between the movable wedge 74 and a gear 95, identified below, is generally designated by the numeral 89. More particularly a shaft 90 connects one side of the vernier 68 to one side of a coupling 91 and the other side of the coupling is connected by a shaft 92 to a precision 10-turn potentiometer 93, which in turn is connected by a shaft 94 to a worm gear 95 (FIG. 6) and a two-phase servomotor 96. The servomotor is mounted on an angle iron 97 rising from the base 64. The worm gear 95 is in mesh with a worm wheel segment 98 which is pivoted on a stud 99 rising from the base portion of angle 97.

A cam 100 is adjustably secured to the segment 98 by means of a screw 101 which passes through a radially disposed slot 102. Screws 103 project through a block 104 mounted at one end of the angle 97 at the same level as the segment 98 and the segment and the screws 103 combine to form a positive limit stop mechanism 105 which stalls the motor 96 to prevent excessive overtravel thereof which might damage the wedge 67 or the potentiometer 93. The cam 100 operates a phase reversal switch 106, also mounted on the base 64, to form a lockout system 107, whose function will be described in the operation.

Referring to FIGS. 2 and 3, power to advance the carriages 32 and 56 is supplied by a motor 108 through a gear reduction 109, both mounted on one end of the frame 26, through chains 110 and 58 to carriage 56 and through chains 110, 111 and 45 to carriage 32. It will be noted in FIGURE 3 that the tubes 36 and 60 are in alignment so that a beam of light from lamp 34 will pass through tubes 36 and 60 to the stress analyzing device 59. Normally closed limit switches 112 and 113 (FIG. 3) are secured in pairs to the uprights 27, each switch of a pair in position to be engaged by the carriages 32 and 56 as they near the end of the track. Each pair of the switches 112 and 113 are wired in series in the power supply circuit to motor 108 so that when either carriage contacts either of the normally closed switches 112—113, the circuit to the motor 108 is deenergized and the carriages 32 and 56 cease moving.

A spring powered reel 114 is provided to take up the slack in an electrical cord 115 which supplies power to the lamp 34 and the blower 38. A flexible cable 116 is fastened to the carriage 56 and is extended onto a helically grooved rewind drum which is mechanically connected to a precision 10-turn potentiometer 117 to indicate the position of the carriage with respect to the glass strip 20 on a visual indicator 118 and recorder 119 (FIG. 11).

If it is desired to measure the stress in the glass with the stress measuring instrument 59 in a stationary position above the glass, or in other words such that the instrument is not moving in a transverse direction with respect to the glass, an odometer is used to measure and relay the longitudinal travel of the glass to the recording indicator, to be described below. The odometer is in the form of a measuring wheel 120 in contact with the top surface of the glass strip 20 (FIGS. 2 and 3) and is supported by a yoke 121 which is pivoted on a cross member of the frame 26. The wheel 120 drives a sprocket 122, a chain 123, a smaller sprocket 124 and a 10-turn potentiometer 125 which is electrically connected to the recorder 119 and the visual indicator 118. The signals from the potentiometers 117 and 125 are translated into inches of travel on the indicator 118 and the recorder 119. Also the stress signals are fed into the indicator 126 and recorder 119 to correlate the stress with the travel of the sheet, as will be be described hereinafter.

As may be seen in FIGS. 2 and 11, a gear reduction 127 and a gear shifting mechanism 128 powered by a solenoid 129 is interposed between the sprocket 124 and the potentiometer 125 to provide longitudinal measurements of either 100 inches or 10,000 inches. A clutch mechanism 130 having a constant torque rewind spring and a limit stop to the clutch which will slip when the potentiometer 125 has completed 10 turns, is mounted on the input shaft of the potentiometer 125, and is moved into engagement by a solenoid 131.

Referring to FIG. 11, power lines 132 and 133 are interrupted by a switch 134. Closing of switch 134 energizes the system and establishes: circuit A from line 132 through relay coil 135 to line 133 which closes contacts 136 to establish circuit B from line 132 through contacts 136, the lamp 34, the blower motor 38 and the rotating polarizing disk motor 86 to line 133.

If it is desired to take a measurement transversely of the travel of the glass strip 20, switch 137 is closed manually to establish circuit C from line 132 through switch 137 and relay coil 138 to line 133 which closes contacts 139 and also closes contacts 140 to electrically connect the potentiometer 117 to the indicator 118 and to the recorder 119. Assuming that carriages 32 and 56 are at rest against the limit switches 113. In this position limit switches 113 are open and limit switches 112 are closed and the direction of travel of the carriages when taking the next transverse measurement will be toward limit switches 112.

The closing of relay contacts 139 establishes circuit D from line 132 through contacts 139, normally closed relay contacts 141, start winding 142 of motor 108, normally closed relay contacts 143, limit switches 112 and normally closed relay contacts 144 to line 133 and also to the run winding 145 of motor 108. This circuit will be broken when either of the carriages 32 or 56 contacts and opens either of switches 112. The subsequent transverse measurement will move the carriages toward the limit switches 113 which is accomplished by closing switch 146 manually to establish circuit E from line 132 through switch 146 and relay coil 147 to line 133 which opens relay contacts 141, 143 and 144 and closes relay contacts 148, 149 and 150 to establish circuit F from line 132 through contacts 139 and 148, motor field 142 in a reverse direction, contacts 149, limit switches 113, contacts 150 to line 133. The carriages 32 and 56 will break this circuit by opening switches 113 at the end of their travel.

When it is desired to make a longitudinal measurement, parallel to the direction of travel of the strip 20, circuits A and B are energized, circuits C and D or circuits C, E, and F, are held energized till the carriages are properly positioned transversely of the glass strip 20, the circuit selection depending on the direction of travel of the carriages. Switch 151 is closed manually to establish circuit G from line 132 through switch 151 and relay coil 152 to line 133, which closes contacts 153 to connect the potentiometer 125 with the indicator 118 and the recorder 119 and also establishes circuit H from line 132, through switch 151, the primary coil 154 of a transformer 155 to the line 133. At the same time, circuit I is completed from the secondary coil 156 of the transformer 155 through the coil of solenoid 131, the plunger of which engages the clutch 130 connecting the odometer 120 and the potentiometer 125, which in turn is electrically connected with the indicator 118 and the recorder 119. When circuits G and H are energized the measurement will extend for 100" along the glass strip 20 at which time the potentiometer will have completed ten turns and the overload clutch 130 will slip. At this point the solenoid 131 is de-energized, releasing the clutch 130 and the rewind spring (not shown) connected to the potentiometer 125 returns it to starting position.

When it is desired to measure for a distance of 10,000", switch 157 is also closed to establish circuit J from line 132 through switch 157 and the coil of solenoid 129 to line 132 which shifts the gearing 127 between the odometer 120 and the potentiometer 125.

With reference now to the detection of the stress error in the glass, the following components are used: the light source 34 (FIG. 4), stationary polarizing disk 37, a stationary quartz wedge 72, movable quartz wedge 74, quarter-wave plate 79, and a rotating polarizing disk 88 driven by a synchronous motor 86. The principles involved in detecting the stress error are as follows:

In passing plane polarized light through stressed glass, at an angle to the stress, but preferably at 45° to the direction of the principal stresses, it may be considered as being separated into two components, one polarized in the direction of the stress and one perpendicular to it. As the light passes through the glass, these components travel at different velocities. A phase shift results and the light emerges generally elliptically polarized. Experimentally, it has been found that the resulting phase shift is proportional to the stress within the glass to the glass thickness, and inversely to the wave length. This effect on the polarized light is identical with that obtained naturally in some non-stressed crystalline materials such as quartz having two refractive indices. The orientation of the axis and the thickness of the quartz determine the amount by which the retardations of the two components of the light differ, and thus the phase shift which occurs. As the effect of the quartz can be made to be exactly opposite to the effect of the stress in the glass by changing the orientation and/or the thickness of the quartz, a means of measuring the stress in the glass is obtained.

In the system used, a beam of plane-polarized light is passed through the glass to be measured, normal to its surface and with the axis of polarization preferably at a 45 degree angle to the direction in which the glass is principally stressed. The stress in the glass changes this beam generally to elliptically polarized light. The light then passes through the two quartz wedges 72 and 74 which present an untapered variable thickness to the light and can be made to cancel the phase shift caused by the stress in the glass 20 by moving relative to one another as will be described hereinafter. At one position of the wedges, the thickness presented substantially eliminates the phase shift completely.

Above the wedges is a quarter-wave plate 79 which changes plane-polarized light into circularly polarized light. After passing through the quarter-wave plate, the light then passes through a rotating polarizing disk 88. Thus, when the wedges are properly positioned for exact compensation, circularly polarized light will be presented to the rotating polarizing disk and the light output will be constant. When the wedges are not positioned properly, elliptically polarized light will be presented to the rotating disk and a sinusoidally varying light intensity will result giving a stress error signal.

The rotating polarizing disk 88 is driven at 1800 r.p.m. by means of the double pole synchronous motor 86 through a 1 to 2 gear reduction 87 to provide a 60 cycle error signal from the photocell which is fed through an amplifier 153 into one winding of the wedge positioning servomotor 96, the other winding of the servomotor is supplied with 60 cycle lines power. The amplifier 153 may be a Brown electronic amplifier wherein the input has been modified from a chopper to a conventional voltage input to the grid and in which a 120 c.p.s. rejection filter is incorporated in the input circuit. A permanent magnet is inserted into the rotor of the polarizing disk drive motor to insure a single preferred lock in position, rather than the two positions ordinarily present in a two-pole synchronous motor to provide proper phase relationship with the servomotor.

The phase of the error signal will lead or lag relative to the line signal, depending respectively on whether or not uncompensated compressive retardation or tensile retardation is present at the moment. The error signal is amplified and introduced into the servomotor with a quadrature component with respect to the line signal which energizes the second winding of the servomotor causing it to rotate in a direction to reduce the error signal by positioning the wedges 72 and 74 through the gearing 95.

A means of measuring the stress is provided by translating the stress error signal, caused by an improper wedge position, into mechanical motion that drives the quartz wedge 74 relative to the wedge 72 toward the null position, or in other words, toward the position at which the thickness of the combined wedges will tend to cancel the phase shift caused by the stress in the glass so that circularly polarized light will be presented to the rotating polarizing disk.

The operation of the error sensing system is as follows: A sinusoidally varying light intensity, produced by improper placing of the quartz wedge 74, is viewed by the photoelectric tube 83 that converts this varying light into an electrical signal. The electrical signal is then amplified sufficiently to drive the servomotor 96, which in turn positions the quartz wedge 74 so as to reduce the error signal. By measuring the null position of the wedges 72—74, it is possible to determine the stress at the location of the optical system on the glass strip 20.

For the stress-recording system there is provided a Mosely "X—Y" type recorder indicated at 119 which is modified from a conventional voltage input to a self-balancing bridge input. A 10-turn precision potentiometer 93 which constitutes two arms of a bridge is coupled directly to the output shaft of the servomotor 96 which positions the quartz wedge 74. The other two arms of the bridge are also a precision potentiometer located in the Mosely recorder 119 and operated by a servomotor in the recorder which rotates the recorder drum, in proportion to error signal from potentiometer 93. This system provides for motion of the recorder chart as a function of stress. The stress is also indicated in millimicrons of retardation on a visual meter 126.

The term "millimicrons of stress" as applied in the glass industry numerically indicates the relative retardation of the polarized light components passing through the glass and permits measuring either stress in the glass or thickness of the glass, when the other of these is a known factor.

A bridge circuit consisting of either the multiple-turn precision potentiometer 117 for transverse measurement or the potentiometer 125 for longitudinal measurement and a precision potentiometer located in the Mosely recorder 119 and operated by a servomotor positions the pen in the recorder and provides for motion of the pen proportional to the transverse or longitudinal direction of measurement. Excitation for the pen-positioning servomotor is obtained by amplifying the unbalanced signal of the bridge produced when potentiometer 117 is rotated by transverse movement of carriage 56 or when potentiometer 125 is rotated during longitudinal measurement. The position is also indicated in inches on a visual meter 118 (FIG. 11).

The combination of these devices provides an instrument capable of measuring and recording stress in glass. A limit-stop device 105 (FIG. 6) protects the wedges 72—74 and potentiometer 93 in the event of failure of the system and continual rotation of the motor 96.

The instrument was found to be capable of measuring and recording stress over a range from 150 millimicrons tensile stress to 350 millimicrons compressive stress, the accuracy being within ±0.5 millimicron.

A means of removing the stress error signal from the servomotor and replacing this signal with a suitably chosen limited range signal is provided for by the manual lockout system 107. The need for such a device arises when a high stress is suddenly encountered which stress is sufficient to give an error signal in excess of approximately 273 millimicrons. In this case, the error reducing system is unable to determine the proper null and, without the manual lockout, may drive the wedge in the wrong direction to an improper null. In the event of a suddenly applied high stress, the gang switch 105' (FIG. 9) is reversed manually, thereby transferring control of the servomotor 96 from the phototube detection circuit to the manual lockout system 107.

In this instance, the cam 100, which is driven by the servomotor 96, will have reversed the switch 106 and upon the above recited reversal of the manual switch 105', power from an outside source is supplied to the servomotor 96 which will rotate the motor to move the wedge 74 to and slightly beyond the null of 125 millimicrons compressive stress and thereafter the cam 100 and the switch 106 cooperate to reverse the direction of rotation of the servomotor to move the wedge 74 back and forth in a limited range below and above the null position till the switch 105' is again reversed to return control of the servomotor to the phototube error detection circuit. The choice of a null at 125 millimicrons compression is due to the fact that in our practice, such sudden stresses are compressive. Thus, when the manual lockout is removed, the servo system finds the "compressive null" preferable, and will drive in the proper direction. This of course may vary depending on the characteristics of a given medium being analyzed.

In transverse or cross-travel measurement, the two carriages 32 and 56 move simultaneously in alignment at a speed of about 10 inches per minute while the glass strip 20 is moving at a speed of approximately 150 inches per minute. Each measurement is initiated by closing switch 137 and reversing of the direction selector switch 146 from the position of the previous run and is interrupted by opening of any one of the limit switches 112, 113 when contacted by either carriage 32 or 56.

In taking a longitudinal measurement, the operator first selects the desired position for selector switch 157, open for 100 and closed for 10,000 inches, and initiates the measurement by closing switch 151. The apparatus is activated by the odometer 120 pressing on the top surface of the glass strip 20. When the clutch 130 is energized, the wheel 120 is engaged with the potentiometer 125. To protect the potentiometer 125 and gearing 127, a limit stop is incorporated and the voltage on the clutch 130 is adjusted so that the clutch will slip when the potentiometer 125 has completed 10 turns. Such devices are commercially available and well-known in the art. Measurement of the longitudinal displacement is accomplished by using the driven potentiometer 125 as two arms of a bridge circuit, as explained above. In this case potentiometer 117 is not in operation as contacts 140 are open.

As has been mentioned, the longitudinal position and transverse position indicators selectively utilize a rotation precision potentiometer 125 or 117 respectively in a bridge circuit in the recorder 119 as the means for indicating the position of the stress measuring instrument 59 with respect to the glass at any given moment. The recorder 119 records stress as a function of either longitudinal position or transverse position on the glass strip 20, the principles of operation are as follows: The measuring bridge circuit uses the stress potentiometer 93 as two arms of the bridge circuit and a precision potentiometer coupled to the drum of the recorder as the other two arms. The two movable contacts on the potentiometers are connected to an amplifier which receives a signal when the bridge is unbalanced. This amplified signal drives a servomotor that rebalances the circuit by repositioning the movable contact on the potentiometer coupled with the recorder drum.

A separate identical circuit positions the pen and can be used to record either the longitudinal or the transverse position at which the stress is measured. The instrument measures an abscissa 100 inches along the glass, 10,000 inches along the glass, or 100 inches across the glass. As ordinate, it will record either from 150 millimicrons tensile stress to 350 millimicrons compressive stress full scale. Of course the measurements may be varied depending on the size of the glass and the range of stresses it is desired to measure.

The apparatus and method of the invention may also be used to measure the thickness of material where the stress is known since with a given stress, the retardation of the light will be proportional to the thickness of the material.

It is to be understood that the forms of the invention disclosed herein are to be taken as the preferred embodiments thereof, and that various changes in the shape, size and arrangement of parts may be resorted to without departing from the spirit of the invention or the scope of the following claims.

We claim:
1. In apparatus for balancing the relative retardation between different components of a light source after they leave a medium, means for directing plane polarized light energy toward the medium, means positioned to intercept the light energy leaving said medium for balancing the relative retardation of the components of the light energy produced on contacting said medium, means disposed to receive the plane polarized light from said balancing means for converting the same into circularly polarized light while allowing elliptically polarized light to pass therethrough, means for changing the elliptically polarized light coming from said converting means into a pulsating light beam, and means actuated by said pulsating light beam for adjusting said balancing means to a position where the light components passing therethrough are brought into phase coincidence.

2. In apparatus for balancing the relative retardation between different components of a light source after it leaves a medium, a light source for directing plane polarized light energy toward said medium, means positioned to intercept said light energy coming from said medium for balancing a relative retardation of the components of the light energy resulting from contact with said medium, means positioned adjacent said balancing means for converting plane polarized light into circularly polarized light while allowing elliptically polarized light to pass therethrough, a rotating polarizing disk having a single axis of vibration positioned to receive light from said balancing means, a photocell positioned to receive light from said polarizing disk, said photocell being operably connected to one winding of a servomotor, which winding is provided with a constant alternating error voltage, said servomotor being mechanically connected to said balancing means, a second winding in said servomotor connected to an alternating source of power in phase with said constant error voltage, said polarizing disk passing a constant light to said photocell so as to feed a signal to said first winding in phase with said alternating source of power when plane polarized light is fed thereto and passing a varying light to said photocell to transmit an error signal to said first winding which leads or lags the alternating source of power applied to said second named winding when elliptically polarized light is presented thereto to cause said servomotor to rotate and to position said balancing means so as to reduce said error signal.

3. In apparatus for measuring the stress in a glass sheet, a beam of substantially monochromatic light, means located in the path of said light beam for converting it to plane polarized light and directing said plane polarized light toward one surface of the glass sheet, means disposed on the other side of said glass sheet arranged to intercept the polarized light energy components for adjustably changing the phase relationship of said light components, a quarter-wave plate for converting the light coming from said phase changing means into circularly and elliptically polarized light, a rotating polarizing disk located for intercepting the elliptically polarized light which on passing therethrough is converted to a light beam of varying intensity, and means actuated by said varying light beam for adjusting the phase changing means to a position that substantially eliminates the retardation of the components of light coming from said glass.

4. Apparatus for measuring stress in a sheet of glass moving along a path, comprising a polarizing light means disposed beneath the glass sheet and directing a beam of plane polarized light thereon, a double-refracting means disposed above said glass sheet presenting an adjustable thickness to the polarized light components coming from said glass sheet, means disposed to intercept the light coming from said double-refracting means for circularly polarizing said light and passing elliptically polarized light therethrough, a rotating polarizing disk means having a single axis of vibration intercepting the light energy coming from said circularly polarizing means for transmitting elliptically polarized light beam therethrough to produce a light of uniformly varying intensity therefrom, and means actuated by said uniformly varying light beam for adjusting said double-refracting means to compensate for retardation of the polarized light components in the glass.

5. Apparatus for measuring stress in a sheet of glass as claimed in claim 4, in which there is provided means for moving each of the aforesaid means as a unit transversely of said sheet for measuring the stress in glass at any point across its width.

6. Apparatus as claimed in claim 1, wherein said balancing means comprises a quartz wedge compensator movable relative to the path of the light energy striking said medium.

7. Apparatus as claimed in claim 1, wherein said changing means includes a rotating polarizing unit in proximity to said converting means, and said adjusting means comprises a photocell in position to receive light energy which leaves said polarizing unit, and drive means operably connected to said photocell to move said balancing means in response to signals from said photocell.

8. Apparatus as claimed in claim 1, wherein said means for converting plane polarized light into circularly polarized light includes a quarter-wave plate.

9. Apparatus as claimed in claim 8, wherein a green filter is interposed between the light source and the quarter-wave plate to increase the effectiveness of the quarter wave plate.

10. Apparatus for measuring stress in a continuous sheet of glass while it is moving along a path, comprising a first carriage located below the glass sheet and movable transversely of the path of movement of said glass sheet, a polarizing light means carried by said first carriage for directing a beam of plane polarized light through said glass sheet, a second carriage located above the glass sheet and movable transversely of said glass sheet directly above the path of transverse movement of said lower carriage, an adjustable double-refracting means carried by said upper carriage for receiving polarized light components passing through said glass sheet, means for circularly polarizing the light coming from said double-refracting means and passing elliptically polarized light therethrough carried by said upper carriage, a disc of light polarizing material having a single axis of vibration in the plane of the major surface of said disc mounted for rotation on said upper carriage and to intercept the light coming from said circularly polarizing means for producing a light beam of varying intensity from elliptically polarized components passing therethrough, means actuated by said light beam of varying intensity for adjusting the thickness of said double-refracting means to provide compensation for retardation of the light components by the glass, and means operatively connected to said upper and lower carriages for moving the same as a unit transversely of the path of movement of the glass sheets.

11. Apparatus for measuring stress in a continuously moving sheet of glass as claimed in claim 10, in which said carriage moving means reciprocates the carriages from one edge of the glass sheet to the opposite edge and back a preselected number of times.

References Cited in the file of this patent

UNITED STATES PATENTS

| | | |
|---|---|---|
| 1,874,217 | Arberry | Aug. 30, 1932 |
| 1,996,446 | Walters | Apr. 2, 1935 |
| 2,237,565 | Land | Apr. 8, 1941 |
| 2,332,674 | Smith | Oct. 26, 1943 |
| 2,450,761 | MacNeille | Oct. 5, 1948 |
| 2,503,808 | Earl et al. | Apr. 11, 1950 |
| 2,861,493 | Landegren | Nov. 25, 1958 |
| 2,864,278 | Sparks | Dec. 16, 1958 |

FOREIGN PATENTS

| | | |
|---|---|---|
| 540,876 | Great Britain | Nov. 4, 1941 |

OTHER REFERENCES

Professor Coker's Photo-Elastic Apparatus for Determining the Distribution of Stress in Structural and Machine Members, Catalog No. S.B. 92/3 of Adam Hilger, Ltd., London, England, May 1931, pages 11 and 13–15 relied on.

"The Preparation of Standard Glass Discs for the Testing of Internal Strain in Glassware," (Green) Journal of the Society of Glass Technology, June 1945, pages 134–138 relied on.

"The Preparation of the British Model of Standard Strain Discs" (Holland), pages 153–158 relied on, Journal of the Society of Glass Technology; June 1945.